Nov. 2, 1948.    W. A. SHIMP    2,453,080
LIQUID MEASURING AND DISPENSING APPARATUS
Filed Sept. 24, 1945
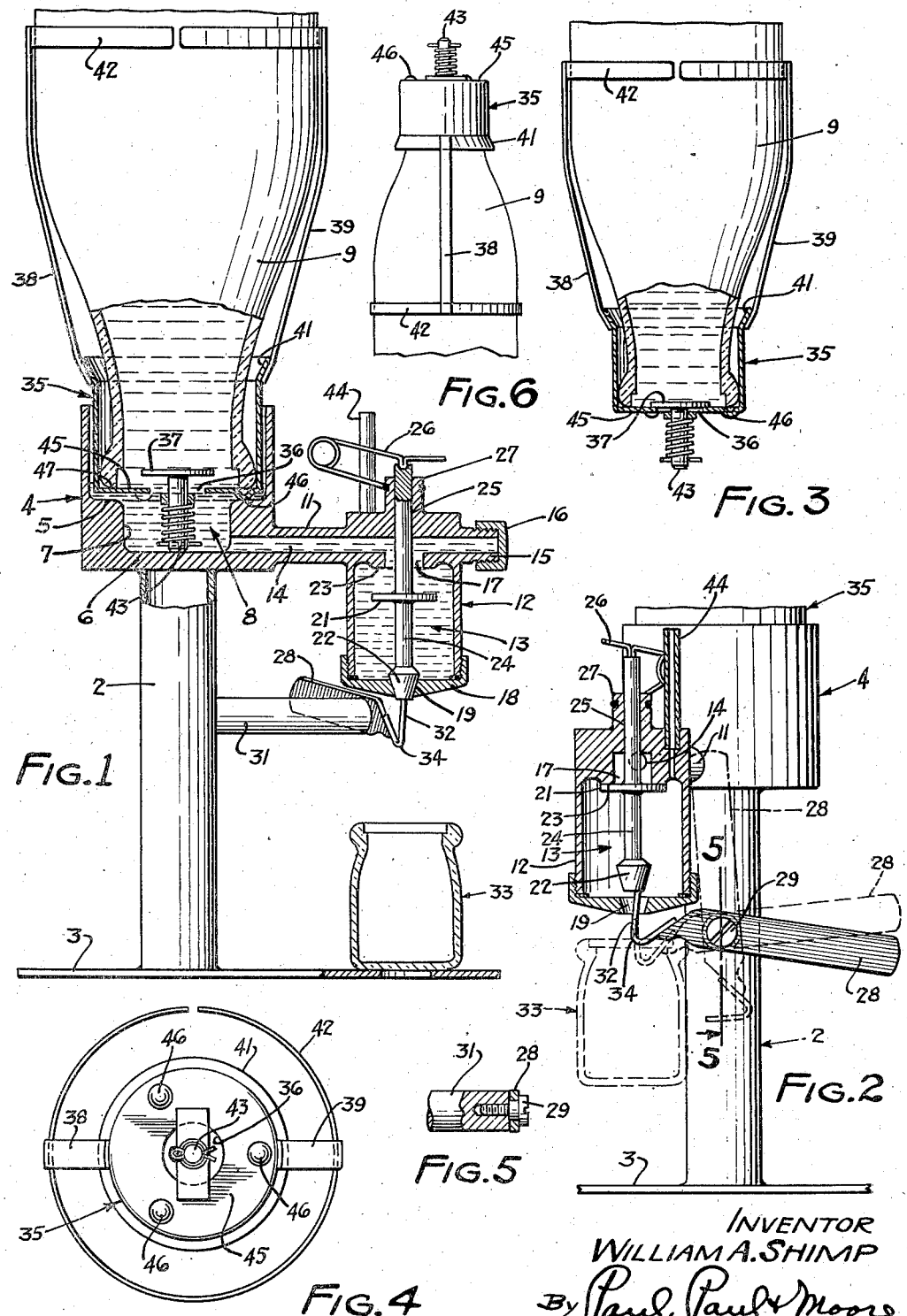
INVENTOR
WILLIAM A. SHIMP
By Paul, Paul & Moore
ATTORNEYS Patented Nov. 2, 1948

2,453,080

UNITED STATES PATENT OFFICE 2,453,080

LIQUID MEASURING AND DISPENSING APPARATUS

William A. Shimp, Minneapolis, Minn.

Application September 24, 1945, Serial No. 618,261

3 Claims. (Cl. 222—453)

1

This invention relates to new and useful improvements in liquid measuring and dispensing apparatuses, and more particularly to such an apparatus which is particularly applicable for use to dispense measured quantities of liquid from bottles, as for example cream.

Numerous attempts have heretofore been made to develop a dispenser of this general character which could be used in restaurants and other such places for conveniently dispensing measured quantities of cream without waste, and with the assurance that the dispensing apparatus is of such construction as to afford the utmost in sanitation, an essential requisite in food dispensers of this general type. To the best of my knowledge, no one has heretofore developed a dispenser such as the one herein disclosed, which is the result of long experimental and research work in an attempt to provide a cream dispenser in which all of the objectionable features hereinbefore present in commercial devices of this general type have been wholly eliminated, and the construction of which is such as to meet the requirements of health authorities and experts, as to sanitary qualities of the apparatus.

An object of the present invention therefore is to provide a simple and inexpensive liquid measuring and dispensing apparatus which comprises a minimum of moving parts, all of which are readily accessible, and are so arranged that they may readily be removed for cleaning purposes, and also whereby the bottle-supporting and measuring cups and the passage therebetween, may readily and quickly be thoroughly cleansed and sterilized in a minimum of time, thereby assuring that the cream or other liquid dispensed from the measuring cup will not be contaminated in any way in its passage through the dispenser.

A further and more specific object of the invention is to provide a cream dispenser comprising a suitable support having a bottle-supporting cup mounted at its upper end and having an annular shoulder or seat therein for supporting a filled bottle in inverted position on the dispenser, and a small chamber being provided in said cup below said seat having a liquid flow passage connecting it with the upper end of a measuring cup disposed in offset relation to the bottle-supporting cup and at a relatively lower elevation, whereby the cream may flow by gravity from the bottle-supporting cup to the measuring cup, and dual valves being provided within the measuring cup, one of which normally closes a discharge provided in the bottom wall of the measuring cup, and the other being adapted to close an intake provided between

2 the measuring cup and said passage, when the lower valve is opened to permit the contents of the measuring cup to empty therefrom through the open discharge.

Other objects of the invention reside in the unique construction of the bottle-supporting and measuring cups which preferably are connected together as an integral unit to facilitate manufacture and to provide such a structure comprising a minimum of joints; in the arrangement of the valve device provided within the measuring cup which comprises a stem having axially spaced valve elements fixed thereto for closing and opening the intake and discharge openings of the measuring cup, said valve stem having its upper end supported in a suitable guide and projecting from said guide, whereby a spring element may be engaged therewith to constantly urge the valve stem in a downward direction to retain the lower valve in discharge-closing position; in the means provided for manually manipulating the valve device to permit the measured quantity of liquid in the measuring cup to discharge therefrom, and whereby the measuring cup may quickly refill, when the operator releases the valve device; in the removable cap provided at one end of the connecting passage between the bottle-supporting cup and the measuring cup to facilitate cleaning of said passage; and in the novel construction of the cap which is fitted over the top of the bottle before placing the bottle in inverted position on the dispenser, when the bottle is in upright position subsequent to removing the usual paper sealing cap from the bottle mouth, said cap member having a normally closed valve therein for preventing discharge of the liquid from the bottle in the operation of placing the bottle in inverted position in the bottle-supporting cup, said valve being so constructed that when the bottle is in position in the bottle-receiving cup, said valve is automatically opened to permit a portion of the contents of the bottle to flow into the bottom of the bottle-supporting cup and through said passage to the measuring cup; and in the resilient arms provided on said cap member for embracing the body of the bottle, and whereby bottles having differently shaped bodies may be supported in the bottle-supporting cup.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view showing a bottle in position on the dispenser and the measuring cup filled;

Figure 2 is a view partially in section showing the valve means manipulated to close the intake and open the discharge, thereby to permit the contents of the measuring cup to empty therefrom;

Figure 3 is a view showing a bottle in inverted position with the bottle supporting cap secured thereto and showing the disk valve closed to prevent leakage from the bottle mouth when placing the bottle in position on the dispenser;

Figure 4 is a bottom view of Figure 3 without the bottle;

Figure 5 is a detail sectional view substantially on the line 5—5 of Figure 2 showing the pivotal mounting of the operating handle; and Figure 6 is a view showing a bottle in upright position with the bottle cap fitted thereover prior to placing the bottle in inverted position upon the dispenser.

The novel liquid and measuring dispensing apparatus herein disclosed is shown comprising an upright supporting standard 2, which may be tubular in cross-section. The lower end of the standard may be secured to a base plate 3 of any suitable shape or construction, whereby the apparatus may be supporting on a table, counter or other flat surface, where desired.

A bottle-supporting cup, generally designated by the numeral 4, is secured to the upper end of the standard 2 and is shown provided with a horizontal annular shoulder or seat 5, spaced upwardly from the bottom wall 6 of the cup, as best shown in Figure 1. The upright wall 7 between the shoulder 5 and the bottom wall 6 cooperates with the bottom wall 6 to define a chamber 8 which normally is in direct communication with the interior of the bottle 9 supported on the dispenser, as will subsequently be described.

The supporting cup 4 is shown provided with a laterally extending neck 11 provided at its outer end with a casing 12 forming a measuring cup 13 which, as shown in Figure 1, is disposed at an elevation beneath the chamber 8 of the bottle-supporting cup 4, whereby the liquid may flow from the bottle-supporting cup 4 to the measuring cup 13 by gravity, as will be understood by reference to Figure 1.

The liquid flow passage 14 is provided in the neck 11 and has one end in direct communication with the chamber 8 in the bottle-supporting cup 4 and extends through the upper wall portion of the casing 12 and terminates in a nipple 15 provided on the casing 12. A knurled cap 16 is removably secured to the nipple 15, whereby access may be had to the passage 14 to facilitate cleaning, as will be understood.

A suitable intake 17 is provided in the upper wall of the casing 12 of the measuring cup for establishing communication between the passage 14 and measuring cup 13. The bottom wall of the measuring cup is shown formed by a detachable cap 18 having a discharge opening 19 therein which is shown disposed directly beneath the intake 17.

To control the flow of cream or other liquid into and out of the measuring cup 13, a suitable valve unit is provided therein comprising a pair of spaced valve elements 21 and 22. The valve element 21 is preferably in the form of a disk, the upper face of which is arranged to sealingly engage a seat 23 encircling the intake opening 17. The lower valve element 22 is preferably frusto-conical in formation and the discharge 19 provided in the bottom cap 18 of the measuring cup is correspondingly shaped, whereby when the valve 22 is in its normal closing position shown in Figure 1, liquid cannot leak or escape through the discharge 19.

The valve elements 21 and 22, as herein disclosed, are integrally formed on a suitable valve stem 24, but it is to be understood that if desired they may be independently formed and thereafter secured to the valve stem in spaced fixed relation, as shown in Figures 1 and 2. The upper end portion of the valve stem 24 is supported in a suitable guide 25 provided in the upper wall of the measuring cup, and said guide is of sufficient length to provide an adequate support for the valve stem when axially actuated to close the intake and open the discharge, or vice versa, in the operation of the dispenser.

To assure leak-tight engagement of the lower valve 22 with its seat, a suitable spring 26 is shown having one end secured to the upstanding portion 27 forming the guide 25 and having its opposite end engaging the upper extremity of the valve stem, whereby a slight downward pressure is constantly exerted on the valve stem to assure proper sealing engagement between the valve element 22 and its seat 19. In some instances it may be found possible to eliminate the spring 26 and depend upon gravity to move the valve 22 into closing engagement with its seat, but in actual practice it has been found that the spring 26 is highly desirable in that it causes the valve stem to return more quickly to discharge-closing position, when the force exerted on the stem to move the intake valve 21 into engagement with its seat is released.

In other words, the operation of the valve stem must be such that when the stem has been moved upwardly to close the intake 17 and permit the contents of the measuring cup to drain from the open discharge at the bottom thereof, when the force exerted on the valve stem to hold it in intake-closing position is released, the valve stem must move quickly to discharge-closing position before a portion of the liquid flowing into the upper end of the measuring cup reaches the bottom of the measuring cup.

In the operation of the cream dispenser herein disclosed it is, as will be understood by reference to Figures 1 and 2, necessary to elevate the valve stem 24 each time the measuring cup 13 is to be emptied of its contents. To provide means for thus conveniently manipulating the valve stem, a small manually operable lever 28 is shown mounted for pivotal movement on a stud 29 secured in the outer end of a branch arm 31 provided on the supporting standard 2. The lever 28 is shown provided at one end with an upright wire-like element 32, preferably bent as shown in Figure 2, whereby the stem 32 may readily enter the discharge opening 19 of the measuring cup 13, when the lever 28 is moved downwardly from the dotted to the full line position shown in Figure 2. When the lever 28 is thus moved downwardly, the disk valve 21 will engage its seat 23 and thus prevent liquid from entering the upper portion of the measuring cup from the passage 14. At the same time, it will be noted by reference to Figure 2, that the discharge 19 is opened to permit the contents of the measuring cup to quickly drain therefrom into a suitable container 33, such as illustrated for example in Figure 1. The shape of the wire element 32 is such that the cream flowing from the discharge opening 19 into the container 33 cannot flow downwardly on the lever 28 because of the bend 34 in the wire element 32 being disposed at an elevation below the connection between the wire element 22 and the adjacent end of the lever 28.

The lever 28 is also so arranged that, if desired, the attendant or operator need not manually grasp the lever 28 to manipulate the valves 21 and 22. If desired, he may grasp the body of the container 33 to be filled and place its rim in engagement with the lower portion of the wire element 34, as indicated by the dotted lines in Figure 2, whereby the valve stem 24 may conveniently be thrust upwardly to open the discharge valve 22 and close the intake valve 21 against the tension of the spring 26. When the container 33 is disengaged from the lever 28, the valve stem 24 will instantly return to its normal discharge-closing position shown in Figure 1.

To facilitate placing the filled bottle 9 in inverted position in the bottle-supporting cup 4, there is provided a suitable closure cap, generally designated by the numeral 35, adapted to be fitted over the bottle top, as illustrated in Figure 6, after the usual paper sealing cap, not shown, has been removed from the mouth of the bottle. A valve opening 36 is provided in the cap 35 which is normally closed by a spring-actuated valve 37. Resilient arms 38 and 39 each have one end suitably secured to the slightly outwardly turned marginal edge portion 41 of the cap 35 and their opposite ends are secured to a resilient split band 42 which embraces the body of the bottle with sufficient friction to retain the cap 35 in contact with the upper edge of the bottle top, when the bottle is inverted from the position shown in Figure 6 to that shown in Figure 3, prior to being placed in position in the bottle-supporting cup 4, as shown in Figure 1. The arms 38 and 39 are preferably disposed in diametrically opposed relation.

Normally, the valve 37 is retained in closed position by a suitable spring, as shown in Figure 3, whereby the filled bottle may readily be inverted from the position shown in Figure 6 for positioning in the bottle-supporting cup 4, as shown in Figure 1. When the bottle is positioned in the cup 4, the valve stem 43 of the valve 37 will engage the bottom wall 6 of the cup 4, whereupon the disk valve 37 is opened, as shown in Figure 1, to permit the cream or liquid in the bottle to flow into and fill the chamber 8 in the cup 4. Such flow of liquid from the bottle into the chamber 8 will also cause the measuring cup 13 to fill as a result of it normally being in direct communication with the chamber 8 through the passage 14 and open intake 17.

A suitable vent 44 is provided in the top wall of the measuring cup 13 to prevent the formation of a vacuum in the measuring cup when draining the contents therefrom, and also to prevent a back-pressure developing therein when the discharge valve 22 is closed and the measuring cup is refilled. The top wall 45 of the cap 35 is shown provided with upwardly extending protuberances 46 which directly engage the seat 5 in the bottle-supporting cup 4, as shown in Figure 1, when the bottle is placed therein, thereby to permit air to escape from the chamber 8 to the atmosphere between the seat 5 and wall 45 of the cap 35, as will be understood by reference to Figure 1. It will also be noted by reference to this figure that the outside diameter of the cap 35 is slightly less than the inside diameter of the bottle-supporting cup 4, thereby to provide a passage for the escape of air from the chamber 8 in the operation of the device. The level of the liquid in the cup 4 does not rise above the top rim 47 of the bottle top, as is well known in dispensers of this general type.

The novel liquid measuring and dispensing apparatus herein disclosed has been found very practical and convenient in actual operation. Its simplicity of construction provides the utmost in sanitation which is highly essential in devices of this kind. In the operation of cleaning the apparatus, the bottom cap 18 is removed from the measuring cup and the valve stem 24 may then be freely withdrawn from the measuring cup and its guide 25, thereby exposing the entire interior of the measuring cup so that it may readily be thoroughly cleansed and sterilized. The cap 16 is also readily removable from the nipple 15, as hereinbefore stated, to permit a cleaning brush or element to be inserted through the passage 14, to thoroughly cleanse it. The bottle-supporting cup 4 is also readily accessible for cleaning when the bottle and its cap 35 are removed therefrom.

The construction of the apparatus is such as to eliminate all sharp corners wherever possible, whereby the operation of cleaning the apparatus is greatly simplified, and with the assurance that the apparatus when subjected to normal cleaning operations will always be thoroughly sanitary, whereby the liquid dispensed therefrom cannot become contaminated by foreign matter which may accumulate in cracks or crevices frequently found in dispensers of this general type.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a liquid measuring and dispensing apparatus, an upright post having a suitable base, a bottle supporting cup fixed to the upper end of the post adapted to receive the open top of a bottle whereby a portion of the contents of the bottle may enter the cup, a tubular neck laterally extending from said cup and in communication with the lower interior portion thereof, a measuring cup secured to and depending from the outer end of said tubular neck and having an intake connecting it to the interior of said tubular neck, a removable cap secured to the lower end of the measuring cup and having a tapered valve seat therein, a valve stem movably mounted within the measuring cup and having a valve head at its lower end normally engaged with said valve seat, said valve stem having a second valve element secured thereto and normaly spaced from said intake, and means exteriorly of the measuring cup for manually actuating the valve stem to momentarily open the discharge valve and close the intake and thereby permit the contents of the measuring cup to discharge therefrom into a suitable receiving means, said valve stem returning to its normal valve seating position when released, thereby to permit the measuring cup to automatically receive another charge from the bottle.

2. In a liquid measuring and dispensing apparatus, a cup-like member having a suitable support, an annular shoulder in said member providing a support for the top end of a bottle when the bottle is inverted thereon, and whereby a portion of the contents of the bottle may drain into the lower portion of said cup-shaped member, a tubular neck extending laterally from said cup shaped member and having a fluid passage therein in direct communication with the lower portion of the cup shaped member, a measuring cup secured to the outer end of said tubular neck and depending therefrom a valve opening establishing communication between the upper end of the measuring cup and the passage in said neck, the passage in said neck extending across the top of the measuring cup and normally closed to the atmosphere by a removable closure, a cap removably secured to the lower end of the measuring cup to provide a bottom therefor, said cap having a tapered valve opening therein forming a discharge for the measuring cup, a valve stem vertically movable in the measuring cup and having a valve head at its lower end, means normally exerting a force on the valve stem to retain said valve head in engagement with said valve seat, a second valve element secured to the valve stem and normally disposed in proximity to said intake, whereby when the valve stem is elevated to open the discharge valve at the bottom of the measuring cup, said second valve element will close the intake to shut off the flow of liquid into the measuring cup while the contents thereof is draining from the measuring cup, and means exteriorly of the measuring cup for manually actuating the valve stem to permit the measured quantity of liquid in the measuring cup to drain therefrom.

3. In a liquid measuring and dispensing apparatus, a cup-like member having a suitable support, an annular shoulder in said member providing a support for the top end of a bottle when the bottle is inverted thereon, and whereby a portion of the contents of the bottle may drain into the lower portion of said cup shaped member, a tubular neck extending laterally from said cup shaped member and having a fluid passage therein in direct communication with the lower portion of the cup shaped member, a measuring cup secured to the outer end of said tubular neck and depending therefrom, a valve opening establishing communication between the upper end of the measuring cup and the passage in said neck, the passage in said neck extending across the top of the measuring cup and normally closed at its outer end to the atmosphere by a removable closure, a cap removably secured to the lower end of the measuring cup to provide a bottom therefor, said cap having a tapered valve opening therein forming a discharge for the measuring cup, a valve stem vertically movable in the measuring cup and having a valve head at its lower end, a guide for the valve stem, means normally exerting a force on the valve stem to retain the valve head in engagement with said valve seat, a disk-like valve secured to the valve stem and normally disposed in proximity to the intake of the measuring cup whereby when the valve stem is elevated to open the discharge valve at the bottom of the measuring cup, said disk-like valve will close the intake to shut off the flow of liquid into the measuring cup while the contents thereof is draining from the measuring cup, means exteriorly of the measuring cup for manually actuating the valve stem to permit the measured quantity of liquid in the measuring cup to drain therefrom, and the axes of the valve guide and the passage in said tubular neck substantially intersecting one another to facilitate cleaning when the valve stem is removed from the measuring cup and the passage in said neck is made accessible by removal of the closure at the outer end thereof.

WILLIAM A. SHIMP.

REFERENCES CITED

The following references are of record in the file of this patent:

UNITED STATES PATENTS

| Number | Name | Date |
| --- | --- | --- |
| 866,191 | Carter | Sept. 17, 1907 |
| 1,342,173 | Joslin | June 1, 1920 |
| 1,813,835 | Bates | July 7, 1931 |
| 2,025,851 | Davis | Dec. 31, 1935 |